Aug. 7, 1962   R. C. GROVES   3,048,070
METHOD AND APPARATUS FOR DISPENSING
Filed July 13, 1956   3 Sheets-Sheet 1

INVENTOR
ROBERT C. GROVES
BY Toulmin & Toulmin
ATTORNEYS

Aug. 7, 1962  R. C. GROVES  3,048,070

METHOD AND APPARATUS FOR DISPENSING

Filed July 13, 1956  3 Sheets-Sheet 2

INVENTOR.
ROBERT C. GROVES
BY Toulmin & Toulmin
ATTORNEYS

Aug. 7, 1962 R. C. GROVES 3,048,070
METHOD AND APPARATUS FOR DISPENSING
Filed July 13, 1956 3 Sheets-Sheet 3
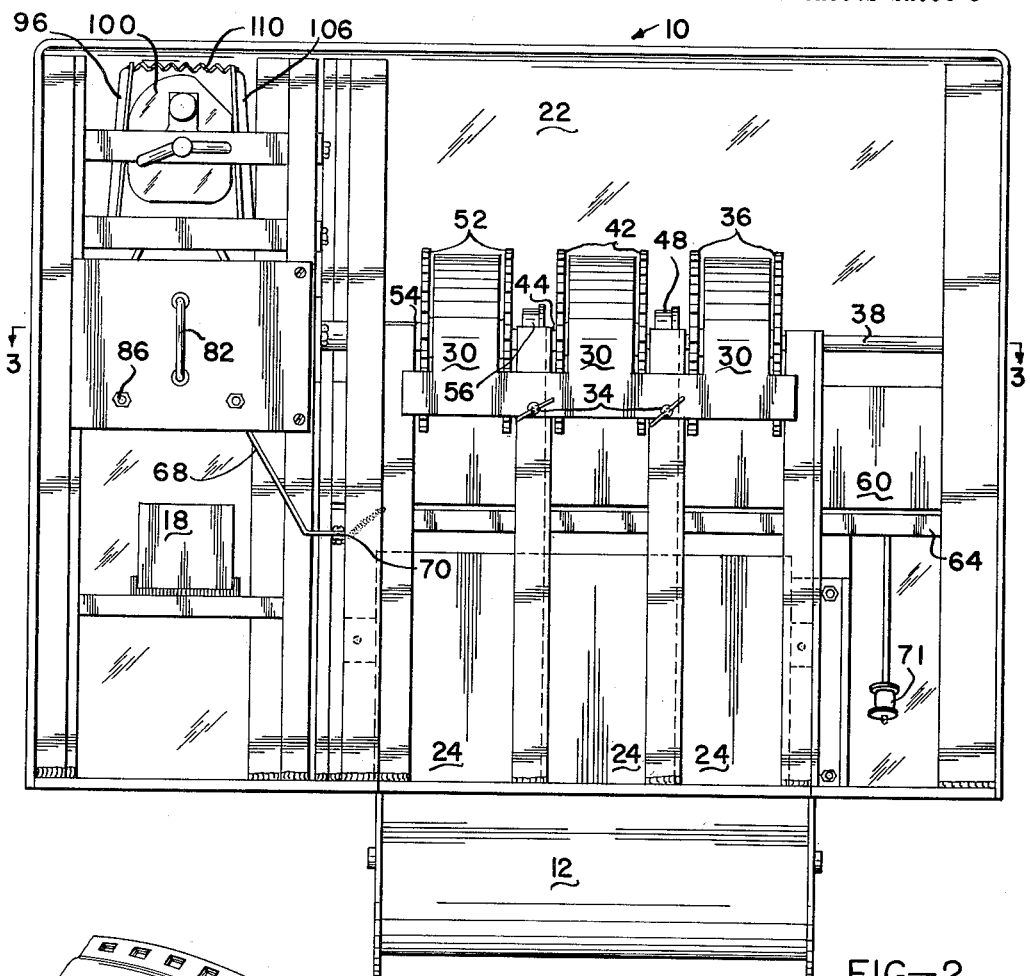
FIG-2
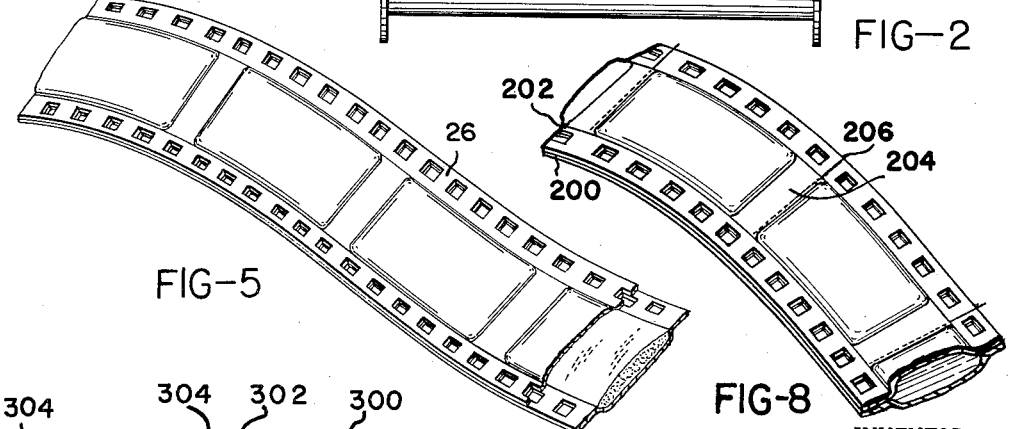
FIG-5
FIG-8
FIG-9
INVENTOR.
ROBERT C. GROVES
BY Toulmin & Toulmin
ATTORNEYS United States Patent Office 3,048,070
Patented Aug. 7, 1962

3,048,070
METHOD AND APPARATUS FOR DISPENSING
Robert C. Groves, 335 Aberdeen Ave., Dayton, Ohio
Filed July 13, 1956, Ser. No. 597,738
5 Claims. (Cl. 83—231)

This invention relates to a dispensing device, and in particular to a coin-operated dispensing device characterized in that the nature of the material dispensed can be selected by the operator of the device.

Dispensing devices, particularly coin-operated dispensing devices, are known; and, a great many thereof in one way or another include the feature of selectability. It is in connection with a coin-operated dispensing machine having such selectability that the present invention is concerned.

The present invention is particularly concerned with a coffee-dispensing machine in which selections can be made between black coffee, coffee with sugar only, coffee with cream only, and coffee with both cream and sugar.

The present invention contemplates the provision of a dispensing device of a coin-operated nature involving the feature of such selectability and arranged for dispensing either liquids or granulated materials.

The dispensing of liquid materials heretofore has been attempted with great difficulty, because of the relatively short keeping life of cream and coffee when in liquid form, and when exposed to the atmosphere as is necessarily the case when used in a dispensing machine.

The powdered or granulated materials have the same drawbacks unless they are maintained away from the atmosphere, so that changes in humidity will not affect them.

More recently, there have been provided convenient sources of hot water, and this greatly simplifies the making of beverages such as coffee from either granulated material from a combination of granulated and liquid ingredients, or from concentrated liquid ingredients which require only the addition of hot water.

Ths present invention has, as a particular object, the provision of an improved dispensing arrangement especially adapted for handling discrete quantities of powdered granulated or liquid materials of the nature referred to, while retaining said materials sealed away from the atmosphere.

A further object of the present invention is the provision of a coin-operated device for handling strips containing the materials to be used in making the beverage and arranged so that the strip can be accurately fed and cut off between pockets of the material being handled.

It is a further object of the present invention to provide a coin-operated device in which the feeding device becomes locked after it is advanced and before the coin slide retracted, while retraction of the coin slide will cut off the strip which has been dispensed, thus preventing any overfeed of the device, either accidentally or deliberately.

A still further object of the present invention is the provision of a coin-operated device of the nature referred to which can be selected to provide for a plurality of different feed combinations so that either one, or a combination, of a plurality of strips can be fed to provide for the combination of ingredients for making the beverage desired.

These and other objects and advantages of this invention will become more apparent upon reference to the following specification taken in connection with the accompanying drawings, in which:

FIGURE 2 is a rear view of the dispensing device;

FIGURE 5 is a perspective view of a perforated strip adapted for being dispensed according to the present invention;

Figure 1:
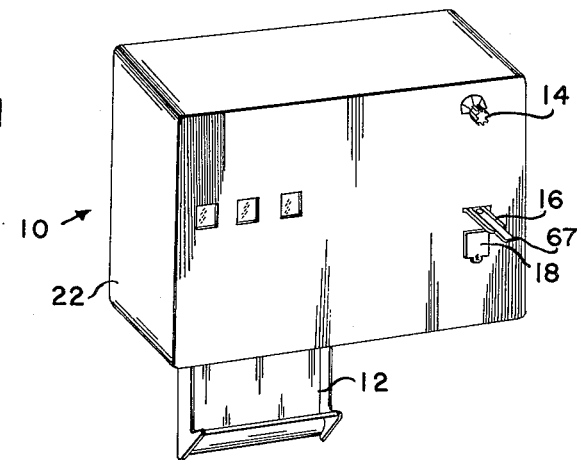
FIGURE 1 is a more or less diagrammatic perspective view showing a dispensing device constructed according to the present invention.

FIGURE 8 is a view, similar to FIGURE 5, but showing the manner in which a strip could be constructed having liquid ingredients contained therein, and including a tear string so that in opening the packet it would be opened at the end, thereby to prevent loss of the material contained in the packet; and FIGURE 9 is a plan view showing another modification in which the tear string extends lengthwise of the strip.

Referring to the drawings somewhat more in detail, the device according to the present invention comprises a frame generally indicated at 10 having a discharge chute at 12, a selector knob at 14, and a coin-operated slide at 16. The coin slide is adapted for dropping coins into a coin drawer 18 therebeneath which is locked closed.

The device illustrated is adapted for feeding from one up to three strips of material, and to this end has the sight windows therein which will indicate immediately when any of the strips become exhausted.

The frame 10 of the device comprises a sheet metal cover 22 mounted on a skeleton-like framework consisting of a plurality of interconnected angle and bar members.

In about the center of the said frame there are spaced upstanding frame members forming vertical spaces 24 which receive in zig-zag arrangement the packs 26 which contain pockets of the material to be dispensed by the device.

These strips are carried upwardly and pass over an arcuate lower supporting strip 28 and beneath an upper arcuate strip 30 radially spaced from strip 28, and with strip 30 being hingedly supported at 32 and being releasably clamped in position as by wing nuts 34. Upper strip 30 is hinged so that any strips of material to be dispensed can be loaded into the machine when necessary.

The upper and lower arcuate strips 28 and 30 are narrower than the strips which are fed from the folded packs 26, and the side edges of these material-carrying strips are perforated so as to be engaged by sprocket wheels. As will be seen in FIGURES 2 and 3, the righthand strip as viewed therein is engaged by the spaced sprocket wheels 36 that are fixed to a shaft 38 extending the width of the machine and journalled therein as by the bearings 40 in the opposite ends thereof.

The intermediate strip is engaged by the spaced sprocket wheels 42 which are fixed on a sleeve 44 that is rotatable about shaft 38, and which sleeve is supported at its right end by a bearing 48 and at its left end by a bearing 50.

Figure 3:
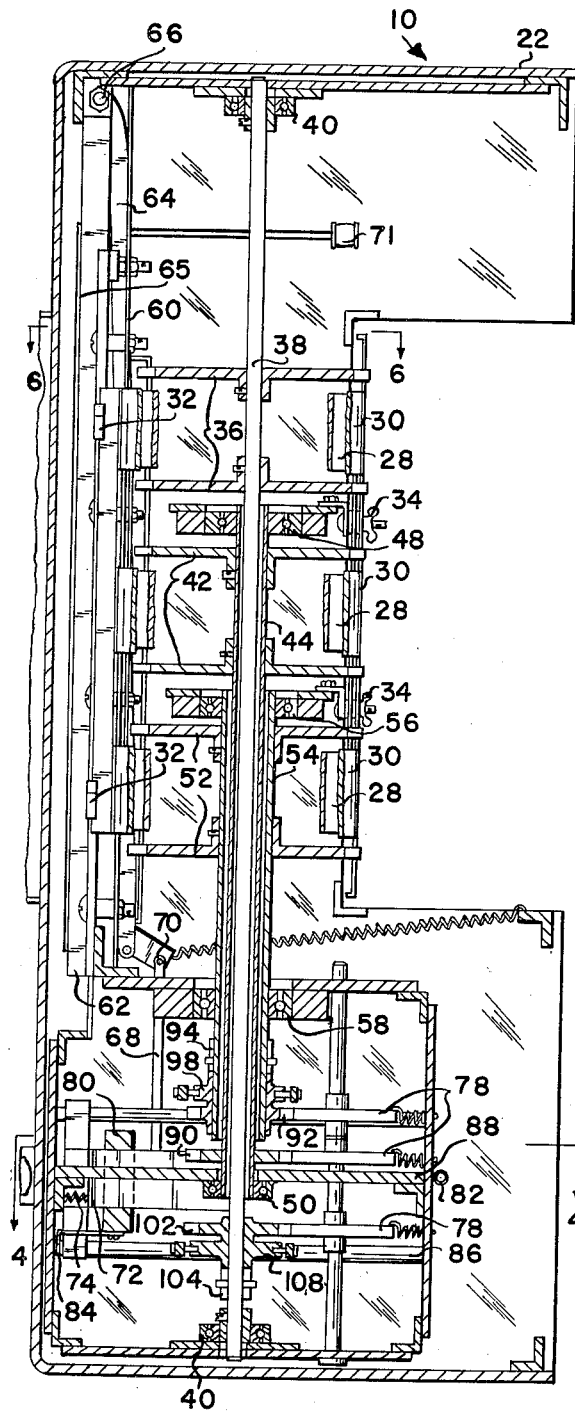
FIGURE 3 is a plan sectional view indicated by line 3—3 on FIGURE 2.

The extreme lefthand strip, as the machine is viewed in FIGURES 2 and 3, is engaged by the spaced sprocket wheels 52 which are mounted on still another sleeve 54 and rotatable about sleeve 44, and having its right end journalled in bearing 56 and its left end journalled in bearing 58. It will be apparent that the three pairs of sprocket wheels are adapted for rotation independently of each other.

Figure 6:
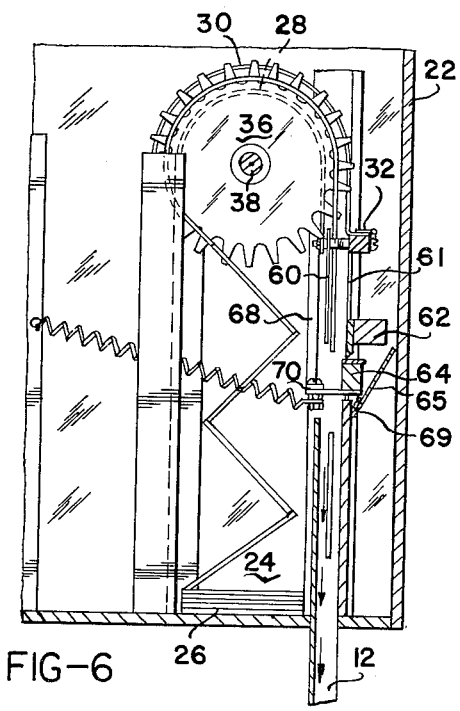
FIGURE 6 is a sectional view indicated by line 6—6 on FIGURE 3 showing the manner in which the strips are fed by the feeding sprocket wheels.

As will be seen in FIGURE 6, rotation of any of the pairs of sprocket wheels will cause the pertaining material-carrying strip to be fed thereby between the arcuate supporting strips, between which the material-carrying strip is passed, and thence downwardly in front of a panel element 60 and behind a second panel member 61 located behind cover 22 of the device. This delivers the strip downwardly into the delivery chute 12 previously referred to.

At a predetermined distance below the axis of the sprocket wheels is located a stationary cutter bar 62 adapted for cooperation with a movable cutter bar 64. The movable cutter bar is pivotally supported at the right side of the machine, as it is viewed in FIGURE 3, on a vertical pivot shaft 66, and is adapted for swinging back and forth about the said pivot shaft so that it is back in its rearmost position when the strip is delivered by the sprocket wheels, and is drawn forwardly after the strip has been delivered so as to cut off strips that are to be deposited in the delivery chute 12.

The swinging of the movable cutter bar 64 is accomplished by reciprocation of the coin slide 67, which is moved inwardly when a coin is deposited therein, and which is thereafter pulled outwardly in order to effect delivery of the strip material being dispensed.

When the cutter bar 64 moves outwardly, due to the withdrawing of the coin slide 67, there is a panel 65 pivotally supported at 69 which yields to permit the knife to move past the limits of the front panel 61 behind which the strips being dispensed pass. This panel 65 is counterweighted as by counterweight 71 so that whenever the cutter bar 64 is moved inwardly the panel 65 will swing back and close the opening in which the cutter bar 64 works, thus preventing staggering of the strips during their movement through the machine, which, otherwise, would sometimes occur.

The coin slide 67 has connected therewith, inside the machine, an arm 68 pivoted at 70 to the end of the movable cutter bar 64 opposite its pivotal support. It will be evident that when the coin slide is moved in the cutter bar 64 will be moved backward, thus exposing the space through which the strips are to be fed, and thereafter, when the coin slide is retracted and brings the cutter bar 64 into cutting relation with bar 62, the strips will be stationarily suspended in position to be sheared off.

Figure 4:
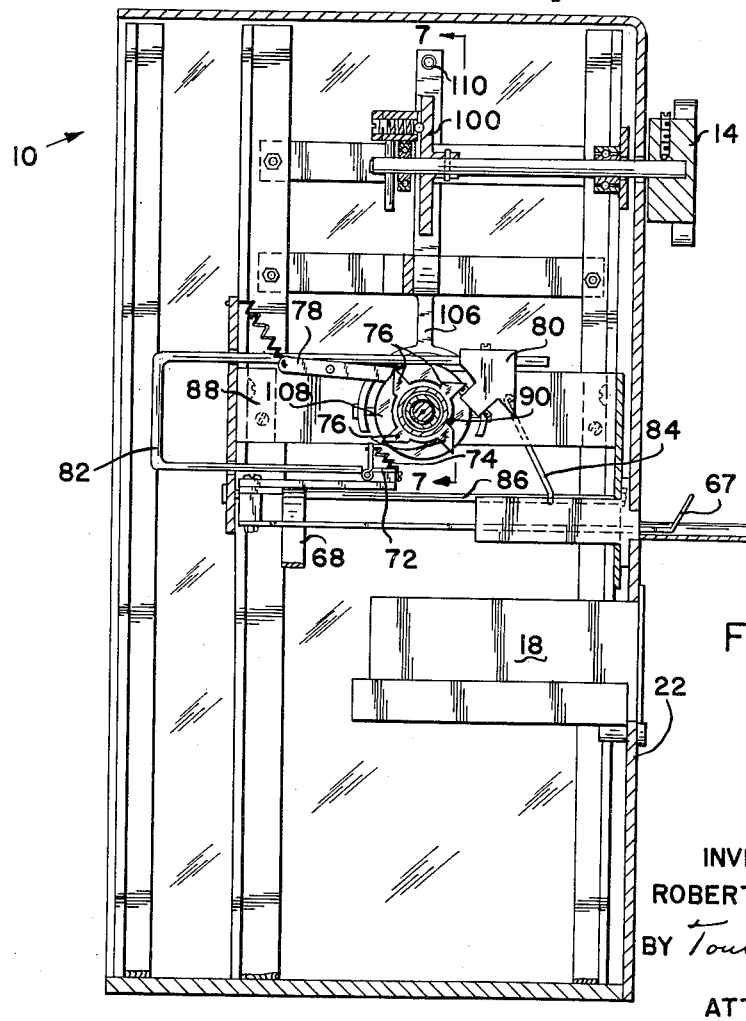
FIGURE 4 is a vertical sectional view indicated by line 4—4 on FIGURE 3.

The actuation of the pairs of sprocket wheels is also accomplished by movement of the coin slide 67 on the inward motion thereof. This is done by the actuating blade 72 which is pivotally supported on the coin slide so that it will fold downwardly toward the left, as it is viewed in FIGURE 4, but has a stopped vertical position, in which position it is illustrated in FIGURE 4. A spring 74 normally holds the actuating blade 72 in its upright position.

Blade 72 is adapted for engagement with one or more of a set of drive wheels that are connected with the pairs of sprocket wheels. Each drive wheel, one of which is illustrated in FIGURE 4 has four drive projections or teeth 76 adapted for engagement by blade 72 for rotation of the drive wheel and the pair of sprocket wheels pertaining thereto.

Each inward movement of the coin slide actuates the drive wheels that are in effective position to rotate through an angle of 90°.

Each drive wheel is prevented from reverse rotation by the spring-loaded detent arm 78, and rotation of the drive wheels beyond the said 90° is prevented by a stop block 80 which is connected with the coin slide to move against a set of the drive projections 76, whereby the drive wheels are fixedly clamped between the stop block and the detent arms when the coin slide is in its innermost position. Inward movement of the stop block 80 is accomplished by the U-shaped member 82 connected therewith, and the end of which, opposite its connection with stop block 80, is adapted for being engaged and moved by the coin slide.

As will be apparent from FIGURE 4, the actuating blade 72 may pass completely beneath the one of the projections or teeth of the drive wheels with which it is engaged in bringing the two stop members into operative engagement with the drive wheel. However, since the backs of the projections or teeth are cut off so as to be horizontal at the time the blade completes movement of the drive wheels, it is actually immaterial whether the drive blade passes beyond the teeth or remains thereunderneath so long as the two stop members are brought against the projections or teeth, thus fixing the drive wheels in position.

Return movement of stop block 80 is accomplished by the wire 84, which is looped about slide rod 86 so as to be engaged by the coin slide upon return movement thereof to move the stop block out of effective position. The vertical rib member 88 provides means on which the stop block 80 is guided and supported during its motion.

It has been mentioned before that the present structure embodies the feature of selectivity. This feature is provided for by arranging a mechanism for selectively moving two of the drive wheels into and out of operative position relative to the actuating blade 72 prior to actuation of the coin slide.

The selecting arrangement provides for actuation of the center drive wheel every time the coin slide is actuated and for selective actuation of the drive wheels on either side thereof. The central drive wheel is thus dispensing the strip carrying coffee, and the side wheels are dispensing the strips carrying cream and sugar.

The selecting arrangement may be seen in FIGURES 2, 3, 4 and 7, wherein it will be noted that the central drive wheel 90 is fixed to sleeve 44 and is thus actuated every time the coin slide is operated. The lefthand one of the drive wheels 92 is slidably keyed as at 94 to sleeve 54, and has associated therewith a shifter fork 96 pivoted in the frame 98 and has its upper end engaged by the rotatable cam 100.

Figure 7:
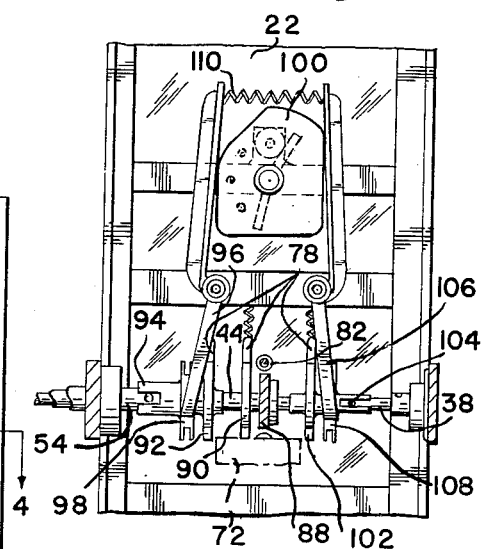
FIGURE 7 is a sectional view indicated by line 7—7 on FIGURE 4 showing the selector cam and the manner in which it is conected with the feed wheels of the device.

The righthand drive wheel 102 is slidably keyed as at 104 to shaft 38, and has associated therewith, similarly to drive wheels 92, a shifter fork 106 pivoted in the frame 108 and having its upper end being also engaged by rotatable cam 100, and with there being a tension spring 110 extending between the said upper ends of the shifter forks. Cam 100 has four operative positions, which are identified as follows:

(1) In the position shown in FIGURE 7 both of the shifter arms are riding on low spots of the cam and the upper portions thereof are thus in their inner positions and the lower portions are in their outer positions. This shifts the drive wheels 92 and 102 out of alignment with the actuating blade 72 which is shown in dot-dash outline in FIGURE 2. The operation of the coin slide in this case will thus actuate only the center drive wheel 90.

(2) Rotation of the cam 100 45° clockwise from its FIGURE 7 position will bring rises under both of the shifter arms and shift the outer drive wheels inwardly into the path of the actuating blade 72. Thus all of the drive wheels will be actuated when the coin slide is operated.

(3) A further shift of 45° clockwise of the cam 100 would leave the righthand shifter arm on a high part of the cam, while bringing the lefthand shifter arm over another low spot whereby the righthand drive wheel will remain in operative position and the lefthand drive wheel will be shifted out of operative position, whereby the righthand drive wheel will be operated together with drive wheel 90.

(4) A still further rotation of 45° of cam 100 beyond its last-mentioned position will bring the lefthand shifter arm on a high spot of the cam and the righthand shifter arm on a low spot, whereby the lefthand drive wheel 92 will be in position to be operated together with drive wheel 90 and the righthand drive wheel 102 will be shifted out of operative position.

It will be apparent from the foregoing that the four effective positions of cam 100 provides for all possible combinations of the drive wheels 92 and 102 with the drive wheel 90.

In operation, the selector dial 14 is preset to indicate the proper strip or strips to be dispensed, a coin is placed in the coin slot, the coin slot is then pushed inwardly which causes the feeding of the strip or strips, and is then pulled outwardly which causes severing of the strip or strips so that they fall into the delivery chute 12, while simultaneously the movable cutter bar 64 substantially closes the space through which the strips are being fed thereby preventing any tampering with the machine.

It is to be noted that the sprocket wheels that feed the strips can be driven a certain distance each time the coin slide is operated, and that they are locked in place after being turned a certain amount, namely, 90°.

While the coin slide is in its innermost position, and the strips to be dispensed are thus in a position where they could conceivably be grasped and drawn out of the machine, the stop block locks the dispensing wheels against rotation, and thereafter, when the coin slide is withdrawn and the strips are severed, the cutter bar covers the opening through which the strip is to be fed.

It is to be noted that the carrier strips, one of which is illustrated in FIGURE 5, are characterized in that the perforated edge portions are arranged relative to the pockets of material thereon so that a certain fixed relation exists therebetween and a certain angular rotation of the dispensing wheels will cause the feeding of a definite length of the strip material.

By so arranging the strip material, the space between the pockets of material thereon always comes to rest in front of the cutter bar, and each strip is severed in this region when the cutter bar is operated, thus leaving each cutoff package of material intact and preventing the pockets of material on the undispensed positions of the strips from being damaged in any way.

The strip illustrated in FIGURE 8 comprises a backing strip 200 and a covering strip 202, which are sealed together along their side edges, and which edges are perforated, and which are also sealed together across the transversely extending zones 204.

According to the present invention, the carrier strip may advantageously be so constructed as to include a pull string 206 arranged adjacent the end of each pocket, so that after the individual pocket has been severed from the carrier strip, the string can be utilized for opening the package at the extreme end, whereby all of the material therein can readily be transferred to a container. Other means of opening the pocket, so as to prevent loss of any of the contents, will be apparent to those skilled in the art.

The foregoing description has dealt particularly with the handling of strips containing pockets of dry granulated materials, but it will be evident that the same dispensing device could be employed with the strip of FIGURE 8, which contains pockets of liquid; or, that the device could be employed with one or more strips of each type, and that the same mode of operation would obtain.

In FIGURE 9, there is illustrated a carrier strip 300 which corresponds substantially with the carrier strip of FIGURES 5 and 8, with the exception that in the zone 302 between adjacent pockets there is an aperture 304 which reduces the amount of material which must be severed by the cutting blade, and with the tear string 306 extending lengthwise of the strip.

By the FIGURE 9 arrangement, the tear string 306 can be severed when the strip is severed, or the cutting knife may be notched so as to cut the string and the string can then be threaded between gripper rolls or the like, so that the tear string is automatically torn open as it is fed.

It will be understood that this invention is susceptible to modification in order to adapt it to different usages and conditions; and, accordingly, it is desired to comprehend such modifications within this invention as may fall within the scope of the appended claims.

I claim:

1. In a dispensing device; a frame, a plurality of compartments in the frame in side by side relation for receiving elongated perforated strips to be dispensed, a plurality of coaxial drive sprockets in the frame which engage the perforations of said strips, a shaft fixed to each drive sprocket, said shafts being arranged in coaxial telescoping relation and being independently rotatable, a drive element connected with each shaft, an actuating member carried by the device for operation from externally of the device, said actuating member having an actuating element pivotally mounted thereon movable by movement of said actuating member into position to engage the drive elements on said shafts and to drive the drive elements and shafts and therefore said drive sprockets in one direction of movement only of said actuating member, control means operable for moving at least some of said drive elements selectively into position to be engaged by said actuating element or out of said position thereby to provide for selective actuation of said drive elements, a discharge passage in said frame into which said strips are fed at the top by said drive sprockets and which passage opens to the outside of said dispensing device at the bottom, a movable cutoff blade in said passage extending transversely thereon between the top and bottom thereof, and means drivingly connecting said cutoff blade with said actuating member for actuation of the cutoff blade in response to movement of said actuating member.

2. In a dispensing device; a frame, a plurality of compartments in the frame in side by side relation for receiving elongated perforated strips to be dispensed, a plurality of coaxial drive sprockets in the frame which engage the perforations of said strips, a shaft fixed to each drive sprocket, said shafts being arranged in coaxial telescoping relation and being independently rotatable, a drive element connected with each shaft, an actuating member carried by the device for operation from externally of the device, said actuating member having an actuating element thereon movable by movement of said actuating member into position to engage the drive elements on said shafts and to drive the drive elements and shafts and therefore said drive sprockets in one direction of movement only of said actuating member, control means operable for moving at least some of said drive elements selectively into position to be engaged by said actuating element or out of said position thereby to provide for selective actuation of said drive elements, a discharge passage in said frame into which said strips are fed at the top by said drive sprockets and which passage opens to the outside of said dispensing device at the bottom, a movable cutoff blade in said passage extending transversely thereon between the top and bottom thereof, and means drivingly connecting said cutoff blade with said actuating member for actuation of the cutoff blade in response to movement of said actuating member, said cutoff blade being normally positioned so as to close said passage and being moved by said actuating member out of passage closing position when the actuating member moves in said one direction to actuate said drive elements, said cutoff blade being moved back into passage closing position while simultaneously severing any strip in said passage upon retraction of said actuating member in the other direction following actuation of said drive elements.

3. In a dispensing device; a frame, a plurality of compartments in the frame in side by side relation for receiving elongated perforated strips to be dispensed, a plurality of coaxial drive sprockets in the frame which engage the perforations of said strips, a shaft fixed to each drive sprocket, said shafts being arranged in coaxial telescoping relation and being independently rotatable, a drive element carried by each shaft, an actuating member carried by the device for operation from externally of the device, said actuating member having an actuating element thereon movable by movement of said actuating member into position to engage the drive elements on said shafts and to drive the drive elements and shafts and therefore said drive sprockets in one direction of movement only of said actuating member, control means operable for moving at least some of said drive elements selectively into position to be engaged by said actuating element or out of said position thereby to provide for selective actuation of said drive elements, a discharge passage in said frame into which said strips are fed at the top by drive sprockets and which passage opens to the outside of said dispensing device at the bottom, a movable cutoff blade extending tranversely in said passage between the top and bottom thereof, and means drivingly connecting said cutoff blade with said actuating member for actuation of the cutoff blade in response to movement of said actuating member, said cutoff blade being normally positioned so as to close said passage and being moved by said actuating member out of passage closing position when the actuating member moves in said one direction to actuate said drive elements, said cutoff blade being moved back into passage closing position while simultaneously severing any strip in said passage upon retraction of said actuating member in the other direction following actuation of said drive elements, said actuating member having a normal retracted position and a second position to which it is moved when moved in said one direction for actuating said drive elements, and stop means actuated by said actuating member when the actuating member is moved to its said second position and operable for engaging and precisely locating and positively locking said drive elements.

4. In a dispensing device; a frame, a plurality of compartments in the frame in side by side relation for receiving elongated perforated strips to be dispensed, a plurality of coaxial drive sprockets in the frame which engage the perforations of said strips, a shaft fixed to each drive sprocket, said shafts being arranged in coaxial telescoping relation and being independently rotatable, a drive element carried by each shaft, an actuating member carried by the device for operation from externally of the device, said actuating member having an actuating element thereon movable by movement of said actuating member into position to engage the drive elements on said shafts and to drive the drive elements and shafts and therefore said drive sprockets in one direction of movement only of said actuating member, control means operable for moving at least some of said drive elements selectively into position to be engaged by said actuating element or out of said position thereby to provide for selective actuation of said drive elements, a discharge passage in said frame into which said strips are fed at the top by said drive sprockets and which passage opens to the outside of said dispensing device at the bottom, a movable cutoff blade in said passage extending transversely thereof between the top and bottom thereof, and means drivingly connecting said cutoff blade with said actuating member for actuation of the cutoff blade in cutting direction response to movement of said actuating member in its other direction of movement, said drive elements being toothed and said actuating element comprising a plate pivoted to said actuating member and yieldable thereon in said other direction of movement of said actuating member, some of said drive elements being slidably keyed to their respective shafts and said control means being operable for shifting said drive elements longitudinally on their shafts into and out of the path of movement of said plate.

5. In a dispensing arrangement of the nature described; a plurality of compartments in side by side relation for receiving elongated perforated strips, drive sprocket means above each compartment engaging the perforations of the strips, arcuate guide elements adjacent the sprocket means for engaging and holding the perforated strips in engagement with the drive sprocket means, a shaft fixed to each of said drive sprocket means, said shafts being coaxial and rotatable independently of each other, a toothed drive member connected with each said shaft, a slide, a drive element pivotally mounted on the slide positioned for drivingly engaging the teeth of said drive members in one direction of movement only of said slide to actuate the drive sprocket means when the slide moves in one direction, said drive element passing idly by said teeth when said slide moves in the other direction, shifter means associated with said drive members selectively operable for shifting predetermined ones of said drive members into or out of the path of movement of said drive element to make said drive members selectively effective or ineffective, means operated by the slide for engaging and locking said drive members against rotation when the slide is moved to its extreme position in said one direction, a downwardly extending passage through which the fed strips pass, a stationary cutter bar extending transversely across one side of said passage, a movable cutter bar pivoted at one end to the stationary cutter bar, and means connecting the other end of the movable cutter bar with the slide for retracting movement of said movable cutter bar away from the stationary cutter bar when said slide moves in said one direction and for movement of said movable cutter bar toward said stationary cutter bar for cutting off strips in said passage when the slide moves in the other direction.

References Cited in the file of this patent

UNITED STATES PATENTS

| | | |
|---|---|---|
| 724,187 | Joyce | Mar. 31, 1903 |
| 938,977 | Clauss et al. | Nov. 2, 1909 |
| 943,652 | Coe et al. | Dec. 21, 1909 |
| 1,010,577 | Bolli et al. | Dec. 5, 1911 |
| 1,071,732 | Genovese | Sept. 2, 1913 |
| 1,334,728 | Wolters | Mar. 23, 1920 |
| 1,710,393 | Williams | Apr. 23, 1929 |
| 1,813,934 | Knee | July 14, 1931 |
| 1,830,571 | Sullwald | Nov. 3, 1931 |
| 1,885,898 | Coffman | Nov. 1, 1932 |
| 1,897,654 | Pfeiffer | Feb. 14, 1933 |
| 2,066,566 | Janson et al. | Jan. 5, 1937 |
| 2,149,713 | Webber | Mar. 7, 1939 |
| 2,195,770 | Doebeli | Apr. 2, 1940 |
| 2,335,159 | Salfisberg | Nov. 23, 1943 |
| 2,511,041 | Bowden et al. | June 13, 1950 |
| 2,587,928 | Tuck et al. | Mar. 4, 1952 |
| 2,595,060 | Dixon et al. | Apr. 29, 1952 |
| 2,645,543 | Mancini | July 14, 1953 |
| 2,649,993 | Burdick et al. | Aug. 25, 1953 |
| 2,708,968 | Soave | May 24, 1955 |
| 2,745,751 | Pichardo | May 15, 1956 |
| 2,755,084 | Dodegge | July 17, 1956 |